(12) United States Patent
Saeki

(10) Patent No.: US 6,535,630 B1
(45) Date of Patent: Mar. 18, 2003

(54) IMAGE DISPLAY METHOD, IMAGE PROCESSING SYSTEM, AND RECORDING MEDIUM

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/375,464

(22) Filed: Aug. 17, 1999

(30) Foreign Application Priority Data

Feb. 19, 1999 (JP) .......................................... 11-042138

(51) Int. Cl.$^7$ ................................................ G06K 9/00
(52) U.S. Cl. ...................... 382/162; 382/237; 345/421; 345/582; 348/223
(58) Field of Search ................................ 382/162, 237; 345/582, 421; 348/223

(56) References Cited

U.S. PATENT DOCUMENTS 5,760,782 A * 6/1998 Yutaka et al. ................ 345/582
6,373,594 B1 * 4/2002 Yao et al. ..................... 382/237
6,421,083 B1 * 7/2002 Takakura ..................... 348/223

* cited by examiner

Primary Examiner—Anh Hong Do
(74) Attorney, Agent, or Firm—Morgan, Lewis & Bockius LLP

(57) ABSTRACT

In an image display method, each pixel belonging to one or more extraction areas with the lightness of the original image containing the pixel being contained in all lightness ranges set for the extraction areas is displayed in a first display color, each pixel belonging to one or more extraction areas with the lightness of the original image containing the pixel being out of all lightness ranges set for the extraction areas is displayed in a second display color, each pixel belonging to more than one extraction area with the lightness of the original image containing the pixel being contained in any of the lightness ranges set for the extraction areas and out of any of the lightness ranges is displayed in a third display color, and each pixel not belonging to any extraction area is displayed in the display color of the original image containing the pixel.

10 Claims, 11 Drawing Sheets

IMAGE DISPLAY METHOD, IMAGE PROCESSING SYSTEM, AND RECORDING MEDIUM

BACKGROUND OF THE INVENTION

1. Field of the Invention

This invention relates to an image display method wherein to extract a pixel having a value concerning a predetermined lightness value contained in the lightness range with a value concerning the predetermined lightness value as a threshold value in pixels making up an image, a pixel having a value concerning the lightness value of the image contained in the lightness range and a pixel having a value concerning the lightness value out of the lightness range are displayed on a display unit in different display colors, thereby enabling inspection of measurement, collation, discrimination, and the like, of a displayed object whose image is picked up, an image processing system for executing the method, and a recording medium recording therein a program for realizing the method.

2. Description of the Related Art

Available is an image display method using binarization processing for picking up an image of an object to be imaged such as an assembly or a part by an image pickup machine using a CCD (charge coupled device), comparing the lightness of each of pixels making up the picked-up image with a predetermined threshold value, and displaying the image on a screen of a display unit such as a liquid crystal monitor in white or black based on the comparison result.

The image display method using binarization processing is capable of extracting and displaying the image to be extracted on which inspection of measurement, collation, discrimination, and the like, is to be performed from the picked-up image of an object to be imaged by adjusting a threshold value; the method can be applied to inspection of the object to be imaged based on processing such as counting the pixels making up the image to be extracted.

The following two types of image display method for displaying an image undergoing binarization processing are available:

In the first image display method, a picked-up image is displayed on a display unit, an extraction area surrounding the extraction object of the image is set, and a lightness range is set with either or both of the upper limit value and the lower limit value allowing the pixels making up the extraction object to be extracted as a threshold value. Each pixel belonging to the extraction area and having the image lightness contained in the lightness range is displayed in white, each pixel belonging to the extraction area and having the image lightness out of the lightness range is displayed in black, and each pixel not belonging to the extraction area is displayed in one color.

In the first image display method, if more than one extraction area is set and the lightness range is set for each extraction area, when a pixel belongs to two or more extraction areas, it is displayed in the display color based on the lightness range set for any one of the extraction areas.

The second image display method is a method of displaying each pixel in white or black based on one lightness range for the whole display image.

However, in the first image display method, the pixel belonging to two or more extraction areas is displayed in the display color based on the lightness range set for any one of the extraction areas, thus more than one extraction result cannot be grasped at a time. In the second image display method, the whole display image is displayed in the display color based on one lightness range, thus more than one lightness range cannot even be set.

Further, in the first image display method, the pixels not belonging to the extraction area are displayed in one color as in the example given below, thus the positional relationship between the whole display image and the image displayed in each extraction area cannot be grapsed clearly.

FIGS. 13 and 14 are schematic views to show a product to be inspected according to the conventional first image display method. In FIG. 13, a rectangular label 90 with "ABC" printed on the side of a rectangular parallelopiped product 80 is put on the correct position at the center. In FIG. 14, the label 90 is put in the vicinity of the upper end part of the side of the product 80.

If the product: 80 in FIG. 14 is inspected for the label 90 according to the first image display method, binarization processing display is produced only in the extraction area set in the position intended where the lable 90 is to be detected, thus the product 80 cannot be inspected for the lable 90. In addition, in the first image display method, the pixel not belonging to the extraction area is displayed in one color, thus the cause cannot be grapsed objectively as to whether or not the position where the label 90 is put is abnormal, whether or not the position of the object to be detected is abnormal, or whether or not the label itself is abnormal.

Furthermore, in the first image display method, if a pixel belongs to more than one extraction area, which extraction area the pixel is extracted based on the lightness range set for cannot be understood clearly and not at a time.

For example, to set more than one extraction area at the same position on a display image, set a different stepwise lightness range for each of the extraction areas, classify the object to be extracted based on the value concerning the lightness value, and perform various inspections, which lightness range the extracted pixel is contained in cannot be understood clearly and even if change is made to the lightness range to be used for extraction, the pixels contained in the lightness ranges cannot be understood at a time.

SUMMARY OF THE INVENTION

It is therefore an object of the invention to provide an image display method wherein a plurality of extraction results can be grasped at a time., an image processing system for executing the method, and a recording medium recording therein a program for realizing the method.

According to a first aspect of the invention, there is provided an image display method wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image display method comprising the steps of: setting a plurality of extraction areas to which the pixels to be extracted in the image belong; setting lightness ranges in a one-to-one correspondence with the setup extraction areas, each lightness range for extracting the pixels in the corresponding extraction area; displaying each pixel belonging to one or more extraction areas with the value concerning the lightness value of the image being contained in all lightness ranges set for the extraction areas in a first display color; displaying each pixel belonging to one or more extraction areas with the value concerning the lightness value of the image being out of all lightness ranges set for the extraction areas in a second display color different from the first display color; and displaying each pixel belonging to more than one extraction area with the value concerning the lightness value of the image being contained in any of the lightness ranges set for the extraction areas and out of any of the lightness ranges in a third display color different from the first and second display colors.

According to a second aspect of the invention, there is provided an image display method wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image display method comprising the steps of: setting an extraction area to which the pixels to be extracted in the image belong; and displaying each pixel not belonging to the extraction area in a display color of the image.

According to a third aspect of the invention, there is provided an image display method wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image display method comprising the steps of: setting a plurality of extraction areas to which the pixels to be extracted in the image belong; setting lightness ranges in a one-to-one correspondence with the setup extraction areas, each lightness range for extracting the pixels in the corresponding extraction area; setting extraction display colors in a one-to-one correspondence with the setup extraction areas, each extraction display color for displaying the pixels extracted in the corresponding extraction area; displaying each pixel belonging to one or more extraction areas with the value concerning the lightness value of the image being contained only in the lightness range set for one of the extraction areas in an extraction display color corresponding to the extraction area; displaying each pixel belonging to one or more extraction areas with the value concerning the lightness value of the image being out of all lightness ranges set for the extraction areas in a non-extraction display color different from all extraction display colors; and displaying each pixel belonging to more than one extraction area with the value concerning the lightness value of the image being contained in the lightness ranges set for two or more of the extraction areas in a common extraction display color different from all extraction display colors and the non-extraction display color.

According to a fourth aspect of the invention, there is provided an image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image processing system comprising: means for accepting setting of a plurality of extraction areas to which the pixels to be extracted in the image belong; means for accepting setting of lightness ranges in a one-to-one correspondence with the setup extraction areas to extract the pixels from the corresponding extraction area; means for displaying each pixel belonging to one or more extraction areas with the value concerning the lightness value of the image being contained in all lightness ranges set for the extraction areas on the display unit in a first display color; means for displaying each pixel belonging to one or more extraction areas with the value concerning the lightness value of the image being out of all lightness ranges set for the extraction areas on the display unit in a second display color different from the first display color; and means for displaying each pixel belonging to more than one extraction area with the value concerning the lightness value of the image being contained in any of the lightness ranges set for the extraction areas and out of any of the lightness ranges on the display unit in a third display color different from the first and second display colors.

According to a fifth aspect of the invention, there is provided an image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image processing system comprising: means for accepting setting of an extraction area to which the pixels to be extracted in the image belong; and means for displaying each pixel not belonging to the extraction area on the display unit in a display color of the image.

According to a sixth aspect of the invention, there is provided an image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image processing system comprising: means for accepting setting of a plurality of extraction areas to which the pixels to be extracted in the image belong; means for accepting setting of lightness ranges in a one-to-one,correspondence with the setup extraction areas to extract the pixels from the corresponding extraction area; means for accepting setting of extraction display colors in a one-to-one correspondence with the setup extraction areas to display the pixels extracted in the corresponding extraction area; means for displaying each pixel belonging to one or more extraction areas with the value concerning the lightness value of the image being contained only in the lightness range set for one of the extraction areas on the display unit in an extraction display color corresponding to the extraction area; means for displaying each pixel belonging to one or more extraction areas with the value concerning the lightness value of the image being out of all lightness ranges set for the extraction areas on the display unit in a non-extraction display color different from all extraction display colors; and means for displaying each pixel belonging to more than one extraction area with the value concerning the lightness value of the image being contained in the lightness ranges set for two or more of the extraction areas on the display unit in a common extraction display color different from all extraction display colors and the non-extraction display color.

According to a seventh aspect of the invention, there is provided an image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, the image processing system comprising: means for accepting setting of a plurality of extraction areas to which the pixels to be extracted in the image belong; means for accepting setting of lightness ranges in a one-to-one correspondence with the setup extraction areas to extract the pixels from the corresponding extraction area; determination means for determining whether or not a pixel belongs to any extraction area; comparison means, if the determination means determines that the pixel belongs to any extraction area, for comparing the value concerning the lightness value of the image of the pixel with a threshold value of the lightness range corresponding to each extraction area to which the pixel belongs; means for displaying the pixel on the display unit in a first display color if the comparison means determines that the value concerning the lightness value of the image of the pixel is contained in all lightness ranges; means for displaying the pixel on the display unit in a second display color different from the first display color if the comparison means determines that the value concerning the lightness value of the image of the pixel is out of all lightness ranges; and means for displaying the pixel on the display unit in a third display color different from the first and second display colors if the comparison means determines that the value concerning the lightness value of the image of the pixel is contained in any lightness range and is out of any lightness range.

According to an eighth aspect of the invention, there is provided a computer-readable recording medium recording therein a computer program for causing a computer to determine a display color of an image, to extract in pixels making up the image, a pixel having a value concerning a lightness value of the image contained in a lightness range with a value concerning a predetermined lightness value as a threshold value, for displaying a pixel having a value concerning the lightness value of the image contained in the lightness range and a pixel having a value concerning the lightness value out of the lightness range on a display unit in different display colors, the computer program comprising: first program code means for causing the computer to accept setting of a plurality of extraction areas to which the pixels to be extracted in the image belong; second program code means for causing the computer to accept setting of lightness ranges in a one-to-one correspondence with the setup extraction areas to extract the pixels-from the corresponding extraction area; third program code means for causing the computer to determine whether or not a pixel belongs to any extraction area; fourth program code means, if it is determined that the pixel belongs to any extraction area, for causing the computer to compare the value concerning the lightness value of the image of the pixel with a threshold value of the lightness range corresponding to each extraction area to which the pixel belongs; fifth program code means for causing the computer to determine the display color of the pixel to be a first display color if it is determined that the value concerning the lightness value of the image of the pixel is contained in all lightness ranges as a result of comparing the value concerning the lightness value of the image of the pixel with the threshold value of the lightness range corresponding to each extraction area to which the pixel belongs; sixth program code means for causing the computer to determine the display color of the pixel to be a second display color different from the first display color if it is determined that the value concerning the lightness value of the image of the pixel is out of all lightness ranges as a result of comparing the value concerning the lightness value of the image of the pixel with the threshold value of the lightness range corresponding to each extraction area to which the pixel belongs; and seventh program code means for causing the computer to determine the display color of the pixel to be a third display color different from the first and second display colors if it is determined that the value concerning the lightness value of the image of the pixel is contained in any lightness range and is out of any lightness range as a result of comparing the value concerning the lightness value of the image of the pixel with the threshold value of the lightness range corresponding to each extraction area to which the pixel belongs.

In the first, fourth, seventh, and eighth aspects of the invention, in pixels each belonging to a plurality of extraction areas, a pixel having a value concerning the lightness value of the image containing the pixel being contained in any of the lightness ranges set for the extraction areas and being out of any of the lightness ranges is displayed in the third display color different from the first and second display colors.

Thus, for example, if a pixel which belongs to two extraction areas has a value concerning the lightness value of the image containing the pixel contained in the lightness ranges set for the two extraction areas, it is displayed in white; if the pixel has a value concerning the lightness value of the image containing the pixel out of the lightness ranges set for the two extraction areas, it is displayed in black; and if the pixel has a value concerning the lightness value of the image containing the pixel contained in one lightness range and out of the other lightness range, it is displayed in gray, whereby the extraction results in the two extraction areas can be grasped at a time.

In the second and fifth aspects of the invention, each pixel not belonging to any extraction area is displayed in the display color of the image containing the pixel, whereby the positional relationship between the whole display image and the image displayed in the extraction area can be grasped clearly.

In the third and sixth aspects of the invention, each pixel having a value concerning the lightness value of the image containing the pixel contained in the lightness range set for an extraction area is displayed in the extraction display color corresponding to the extraction area, thereby providing the image display method and the image processing system whereby which extraction area a pixel belonging to more than one extraction area is extracted based on the lightness range set for can be understood clearly and at a time.

DETAILED DESCRIPTION OF THE PREFERRED EMBODIMENTS

Referring now to the accompanying drawings, there are shown preferred embodiments of the invention.

Figure 1:
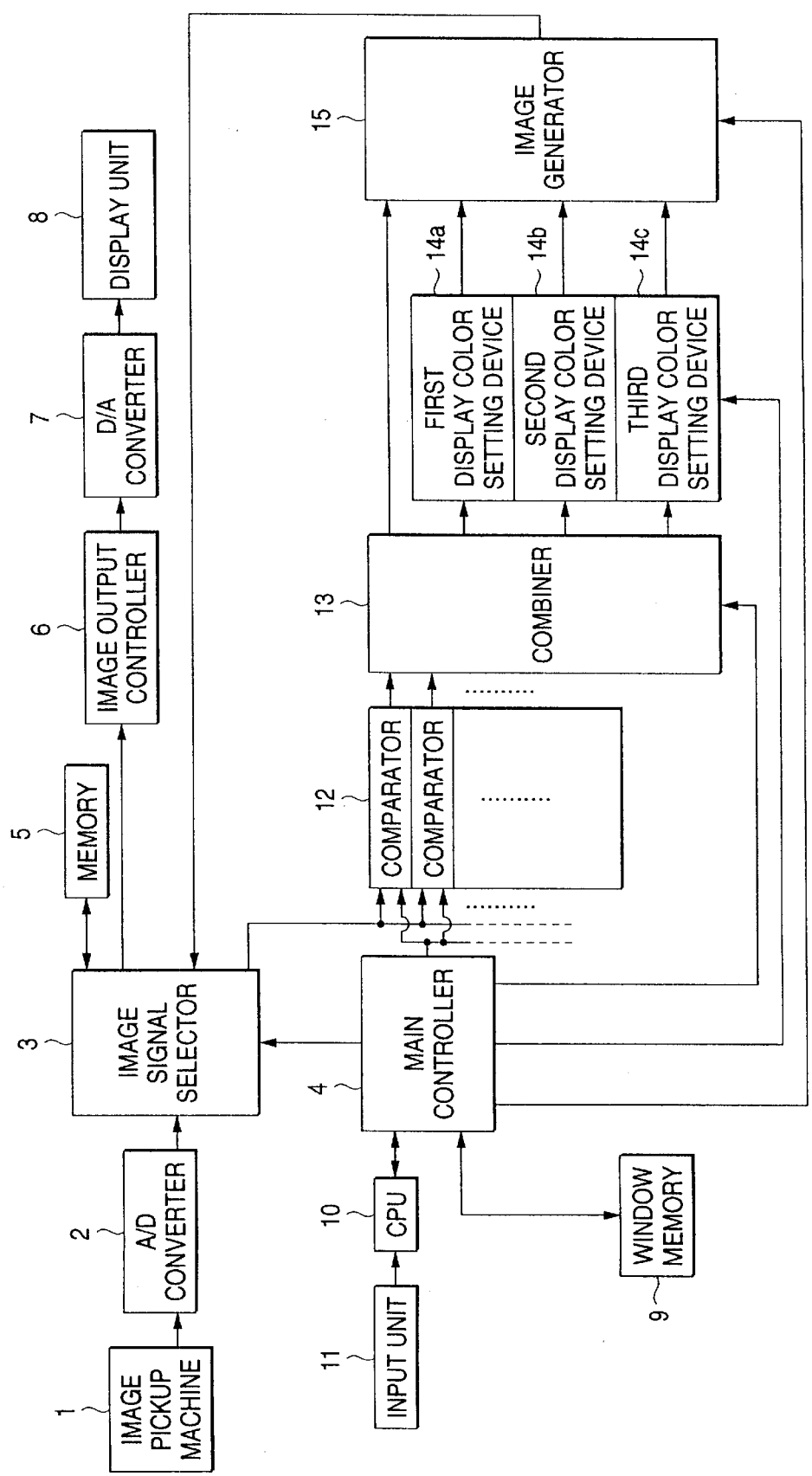
FIG. 1 is a block diagram to show the configuration of an image processing system in a first embodiment of the invention.

First Embodiment:

FIG. 1 is a block diagram to show the configuration of an image processing system in a first embodiment of the invention. In the figure, reference numeral 1 denotes an image pickup machine using a CCD for picking up an image of an object to be imaged. The image pickup machine 1 sends an analog image signal indicating an original image as a picked-up image to an A/D (analog-digital) converter 2.

The A/D converter 2 converts the analog image signal received from the image pickup machine 1 into a digital image signal and sends the digital image signal to an image signal selector 3.

The image signal selector 3 receives a control signal giving an instruction for transferring the digital image signal from a main controller 4, sends the digital image signal to a memory 5 for temporarily storing the digital image signal, reads the digital image signal from the memory 5, and selects either an image output controller 6 for converting the digital image signal into a video signal or a plurality of comparators 12, 12, . . . for comparing the lightness of the original image indicated by the digital image signal with either or both of the upper limit threshold value and lower limit threshold value of a lightness range, then sends the digital image signal to the selected image output controller 6 or comparators 12, 12, . . . .

Also, the image signal selector 3 receives a control signal and sends a digital image signal sent from an image generator 15 for generating the digital image signal undergoing processing of binarization, and the like, to the image output controller 6.

The image output controller 6 combines an extraction area and a display element such as a character, with a video signal into which the digital image signal received from the image signal selector 3 is converted, to generate an output video signal and sends the generated output video signal to a D/A (digital-analog) converter 7, which then converts the output video signal into an analog image signal and sends the analog image signal to a display unit 8 such as a liquid crystal monitor, which then outputs the analog image signal as a display image.

The main controller 4 transfers data concerning an extraction area to and from a window memory 9 for storing an area where the extraction area is set.

Further, the main controller 4 is connected via a control bus to a CPU (central processing unit) 10 for controlling the whole image processing system, and the CPU 10 receives operation signals from an input unit 11 for performing operation of setting an extraction area and a lightness range and the like and performs various types of processing accordingly.

The CPU 10 comprises a volatile memory for recording temporary data occurring during processing of the CPU 10 and information concerning the setup lightness range, and the like.

Each of the comparators 12, 12, . . . receives the digital image signal from the image signal selector 3 and determines whether or not each of the pixels making up the original image indicated by the digital image signal is a pixel belonging to the extraction area stored in the window memory 9. For the pixel belonging to the extraction area, the comparator 12 compares the lightness of the original image with either or both of the upper limit threshold value and lower limit threshold value of the lightness range set through the input unit 11 and sent from the main controller 4.

The comparators 12, 12, . . . make determination and comparison corresponding to different extraction areas and lightness ranges. Thus, for example, if eight comparators 12, 12, . . . are provided, a maximum of eight extraction areas can be set and lightness ranges can be set in a one-to-one correspondence with the extraction areas.

Each comparator 12, 12, . . . adds the determination and comparison results as to each pixel to the digital signal to generate an extraction image signal and sends the generated extraction image signal to a combiner 13 for combining the extraction image signals from the comparators 12, 12, . . . and determining the display color to be output.

The combiner 13 receives the extraction image signals from the comparators 12, 12, . . . and performs operation for determining the display color to be output from each corresponding pixel of each extraction image signal.

According to the operation result, the combiner 13 sends data indicating the pixel not belonging to any extraction area in all extraction image signals to the image generator 15.

For the pixel belonging to any extraction area, the combiner 13 compares the lightness of the original image with either or both of the upper limit threshold value and lower limit threshold value of the lightness ranges set in all extraction areas containing the pixel. If the lightness of the original image is contained in all lightness ranges, the combiner 13 sends data indicating the pixel to a first display color setting device 14a for setting a display color; if the lightness of the original image is out of all lightness ranges, the combiner 13 sends data indicating the pixel to a second display color setting device 14b.

If the lightness of the original image is contained in any lightness range and is out of any lightness range, the combiner 13 sends data indicating the pixel to a third display color setting device 14c.

The first, second, and third display color setting devices 14a, 14b, and 14c set the display colors of the data indicating the pixel sent from the combiner 13 to predetermined display colors for the display color setting devices and send the display colors to the image generator 15.

The predetermined display color is based on a control signal sent from the main controller 4. For example, to output a display image at 256 levels of gray (monochrome), as the display color, white is set for the data indicating the pixel sent to the first display color setting device 14a, black is set for the data indicating the pixel sent to the second display color setting device 14b, and gray (halftone of white and black) is set for the data indicating the pixel sent to the third display color setting device 14c.

The image generator 15 generates a digital image signal processed so as to display the pixel not belonging to the extraction area in the display color of the original image and the pixel belonging to the extraction area in white, black, or gray in response to the lightness of the original image based on the pixel indicating data sent from the combiner 13 and the first, second, and third display color setting devices 14a, 14b, and 14c, and sends the generated digital image signal to the image signal selector 3 to output a display image on the display unit 8.

If an operation signal for selecting a display method is input from the input unit 11, the current display method can be changed in response to a control signal sent from the main controller 4 based on the operation signal. For example, if one extraction area is selected and a display method for display of the comparison result in the extraction area to take precedence over any other display, for the pixel belonging to the extraction area of the extraction image signal sent from the comparator 12 corresponding to the selected extraction area, processing of the combiner 13 is changed so as to send the data indicating the pixel to the first display color setting device 14a or the second display color setting device 14b according only to the comparison result of the comparator 12.

Figure 2:
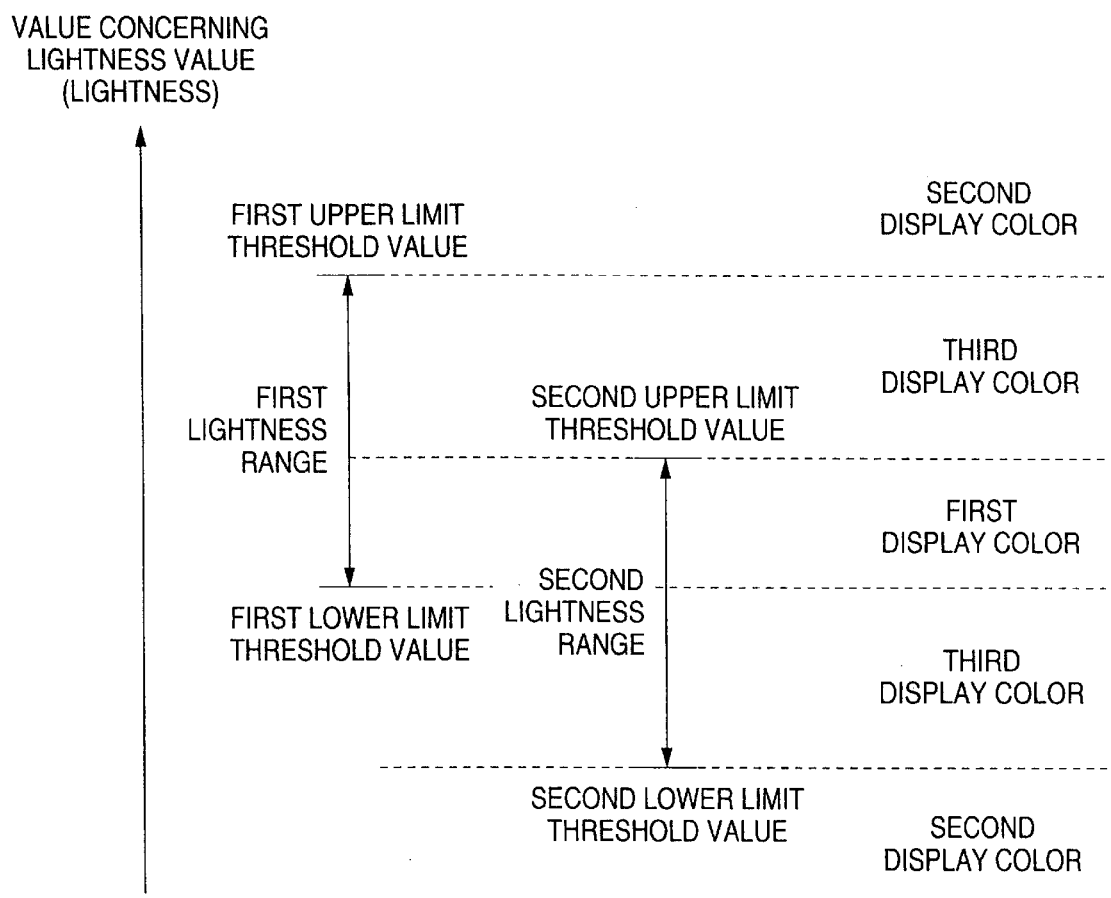
FIG. 2 is a schematic diagram to show the relationship between lightness ranges and display colors.

FIG. 2 is a schematic diagram to show the relationship between lightness ranges and display colors. A first upper limit threshold value and a first lower limit threshold value are set as the upper limit threshold value and lower limit threshold value of a first lightness range set in a first extraction area, a second upper limit threshold value and a second lower limit threshold value are set as the upper limit threshold value and lower limit threshold value of a second lightness range set in a second extraction area, and the first upper limit threshold value, the second upper limit threshold value, the first lower limit threshold value, and the second lower limit threshold value are in the descending order.

At this time, each pixel of the lightness higher than the first lower limit threshold value and lower than the second upper limit threshold value. is contained in the first and second lightness ranges and thus is displayed in a first display color, and each pixel of the lightness higher than the first upper limit threshold value and lower than the second lower limit threshold value is out of the lightness ranges and thus is displayed in a second display color. Each pixel of the lightness lower than the first upper limit threshold value and higher than the second upper limit threshold value and each pixel of the lightness lower than the first lower limit threshold value and higher than the second lower limit threshold value belong to one lightness range and are out of the other lightness range and thus are displayed in a third display color.

For the lightness range, only one threshold value, for example, only the lower limit threshold value can be set and all pixels of the lightness higher than the lower limit threshold value can be displayed in the first display color.

Next, an image display method in the first embodiment of the invention will be described with reference to FIGS. 3 and 4 which are flowcharts to show the processing contents of the image processing system.

First, an original image provided by the image pickup machine 1 picking up an image of an object to be imaged is output as a display image on the display unit 8 at step S101. An extraction area is set as an area surrounding an extraction target based on an operation signal input from the input unit 11 at step S102 and further a lightness range is set corresponding to the setup extraction area at step S103.

To set the extraction area at this time, a pointer superimposed on the display image output on the display unit 8 is operated through the input unit 11 for specifying any desired position. To set the lightness range, either or both of the upper limit value and lower limit value of the lightness of the pixel to be extracted are specified as either or both of the upper limit threshold value and lower limit threshold value of the lightness range. The threshold values can also be specified by entering numeric values; the pointer can also be operated to select the pixel displayed in any desired lightness as the threshold values from among the pixels on the display image.

To set an additional extraction area (YES at step S104), control returns to step S102 at which the extraction area is set, then a lightness range is set corresponding to the extraction area at step S103. In this manner, the operations at steps S102 to S104 are repeated, so that more than one extraction area can be set and lightness ranges can be set for the respective extraction areas.

Upon completion of setting the extraction area and the lightness range (NO at step S104), an image display method is requested to be selected. Then, an image display method is selected based on an operation signal input from the input unit 11 at step S105, the display color of each pixel is set in response to the selected display method at step S106, and an image based on the setup display colors is displayed at step S107.

At step S106, the display color set for each pixel is determined. For example, the display color to be set if normal binarization display in: which the extraction result of a specific extraction area does riot take precedence over the extraction result of any other extraction area is determined as follows:

Whether or not a given pixel belongs to an extraction area is determined at step S201. If it is determined that the pixel belongs to the extraction area (YES at step S201), either or both of the upper limit threshold values and lower limit threshold values of the lightness ranges set for all extraction areas to which the pixel belongs are compared with the lightness of the original image of the pixel at step S202.

If the lightness of the original image of the pixel is compared with the threshold values of the lightness ranges and it is determined that the lightness of the original image is contained in all lightness ranges (1 at step S202), the display color of the pixel is determined to be the first display color at step S204.

At step S202, if it is determined that the lightness of the original image is out of all lightness ranges (2 at step S202), the display color of the pixel is determined to be the second display color at step S205.

At step S202, if it is determined that the lightness of the original image is contained in any lightness range and is out of any lightness range (3 at step S202), the display color of the pixel is determined to be the third display color at step S206.

At step S201, if it is determined that the pixel does not belong to any extraction area (NO at step S201), the display color of the pixel is determined to be the display color of the original image at step S203.

The following types of display method are available: Original image display for displaying the original image as it is, normal binarization display for displaying each pixel in the setup extraction area in the first, second, or third display color in response to the extraction result, selective binarization display wherein for each pixel belonging to the extraction area selected in an image displayed in a normal binarization display mode, the extraction result in the extraction area takes precedence over any other extraction result, and the like. The display method can be changed as required.

Figure 5:
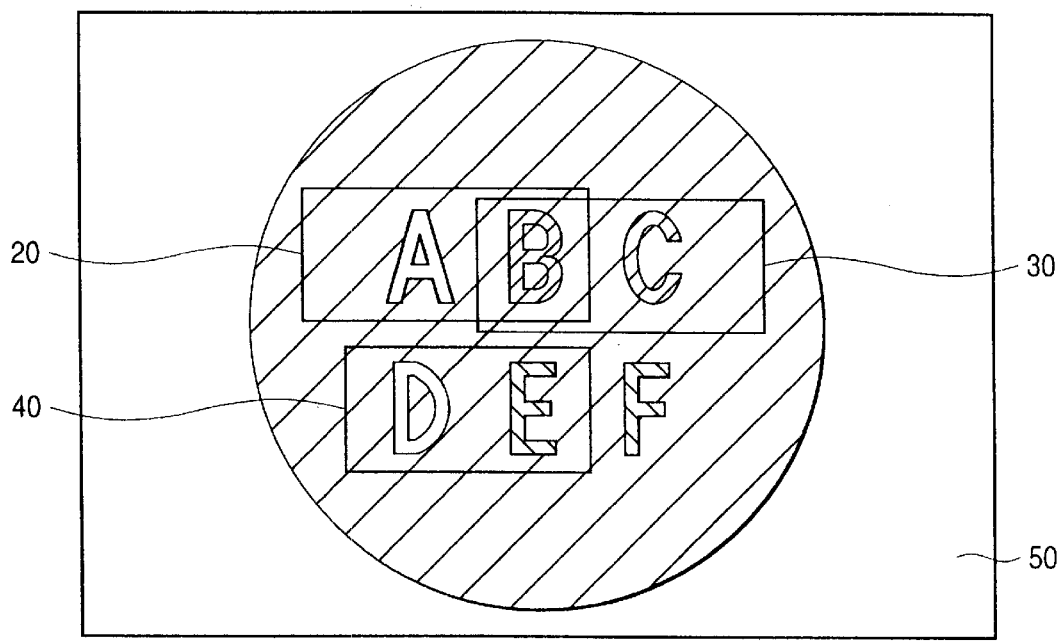
FIG. 5 is a schematic view to show a display image in the image processing system in the first embodiment of the invention.
Figure 6:
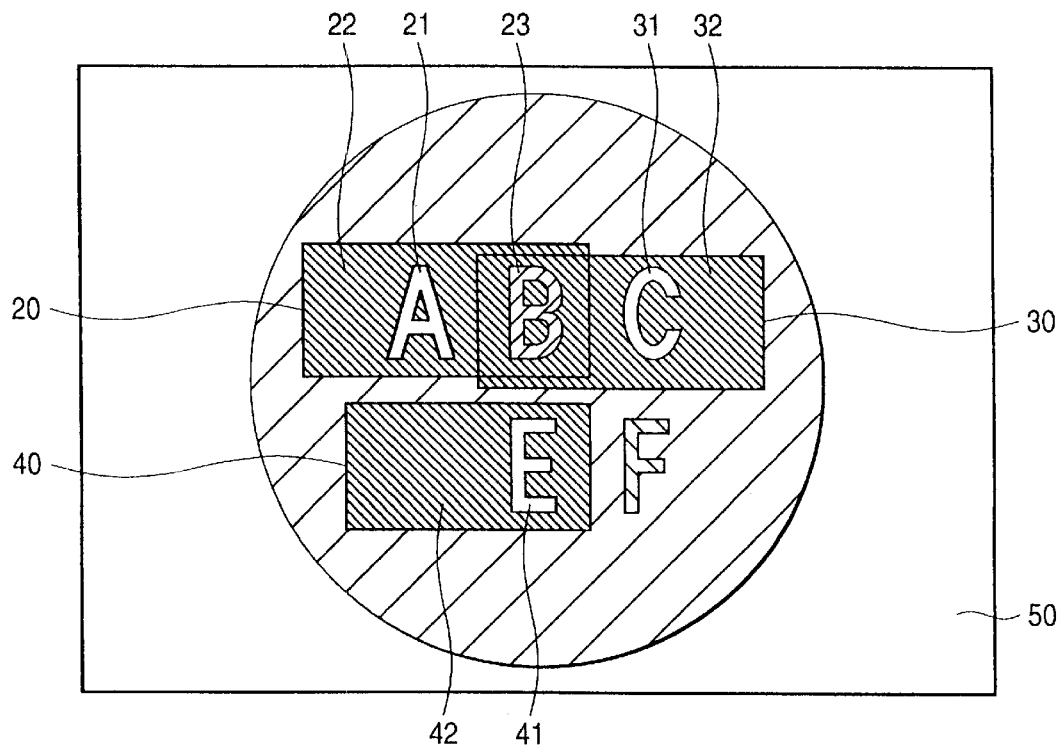
FIG. 6 is a schematic view to show another display image in the image processing system in the first embodiment of the invention.
Figure 7:
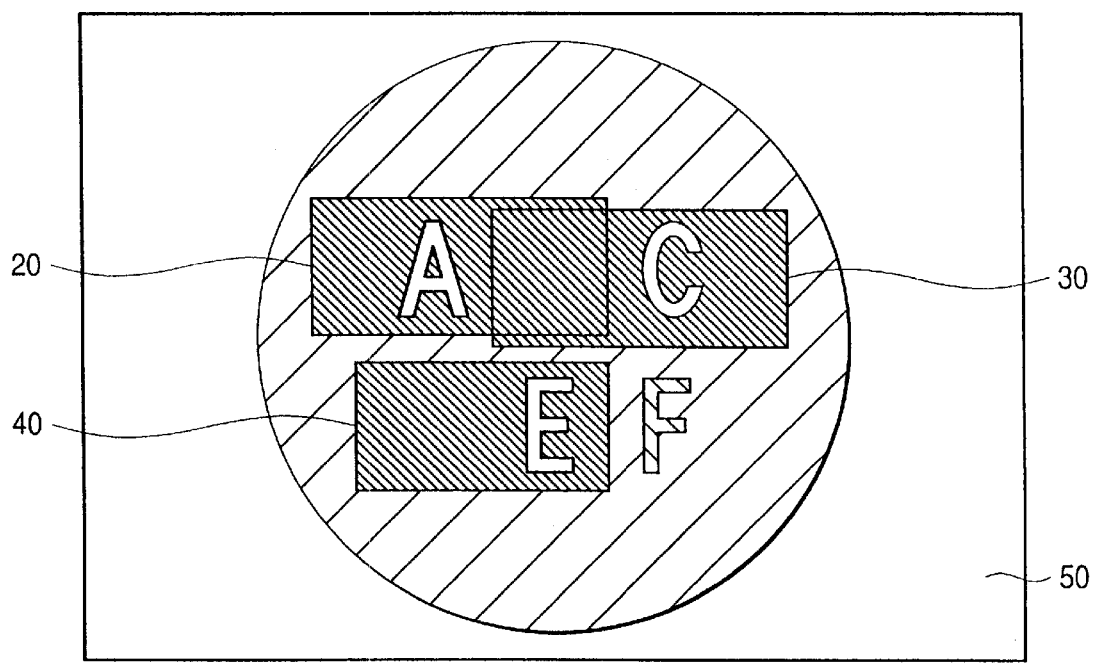
FIG. 7 is a schematic view to show still another display image in the image processing system in the first embodiment of the invention.

FIGS. 5 to 7 are schematic views to show display images in the image processing system in the first embodiment of the invention.

FIG. 5 shows a display image applied when the original image display is selected. In the figure, reference numerals 20, 30, and 40 denote extraction areas. The three extraction areas are thus displayed, but window frames are only displayed and binarization display is not produced; the whole display image except the window frames is displayed in the display color of the original image.

FIG. 6 shows a display image applied when the normal binarization display is selected. In the figure, reference numerals 20, 30, and 40. denote extraction areas. Areas 21, 31, and 41 made up of pixels of the lightness contained in the lightness ranges set for the extraction areas 20, 30, and 40 are displayed in white, and areas 22, 32, and 42 made up of pixels of the lightness out of the lightness ranges are displayed in black. An area 23 made up of pixels belonging to the extraction areas 20 and 30 with the lightness of the original image being out of the lightness range set for the extraction area 20 and contained in the lightness range set for the extraction area 30 is displayed in gray. An area 50 not contained in any extraction areas is displayed in the display color of the original image.

FIG. 7 shows a display image applied when the selective binarization display is selected. In FIG. 7, the extraction area 20 in FIG. 6 is selected as an extraction area whose extraction result is displayed taking precedence over any other. For the pixels in the extraction area 20, no area is displayed in gray and display is produced in white and black.

In the first embodiment, the lightness value itself is used as the value concerning the lightness value; however, the invention is not limited to this mode. A value provided by performing preprocessing for image improvement such as linear or nonlinear conversion processing or histogram flattering processing for the lightness value can be used.

Further, in the first embodiment, the image processing system is formed of dedicated hardware; however, the invention is not limited to this form. The image processing system of the invention may be provided by reading a computer program recorded on a recording medium into a general-purpose computer.

Figure 8:
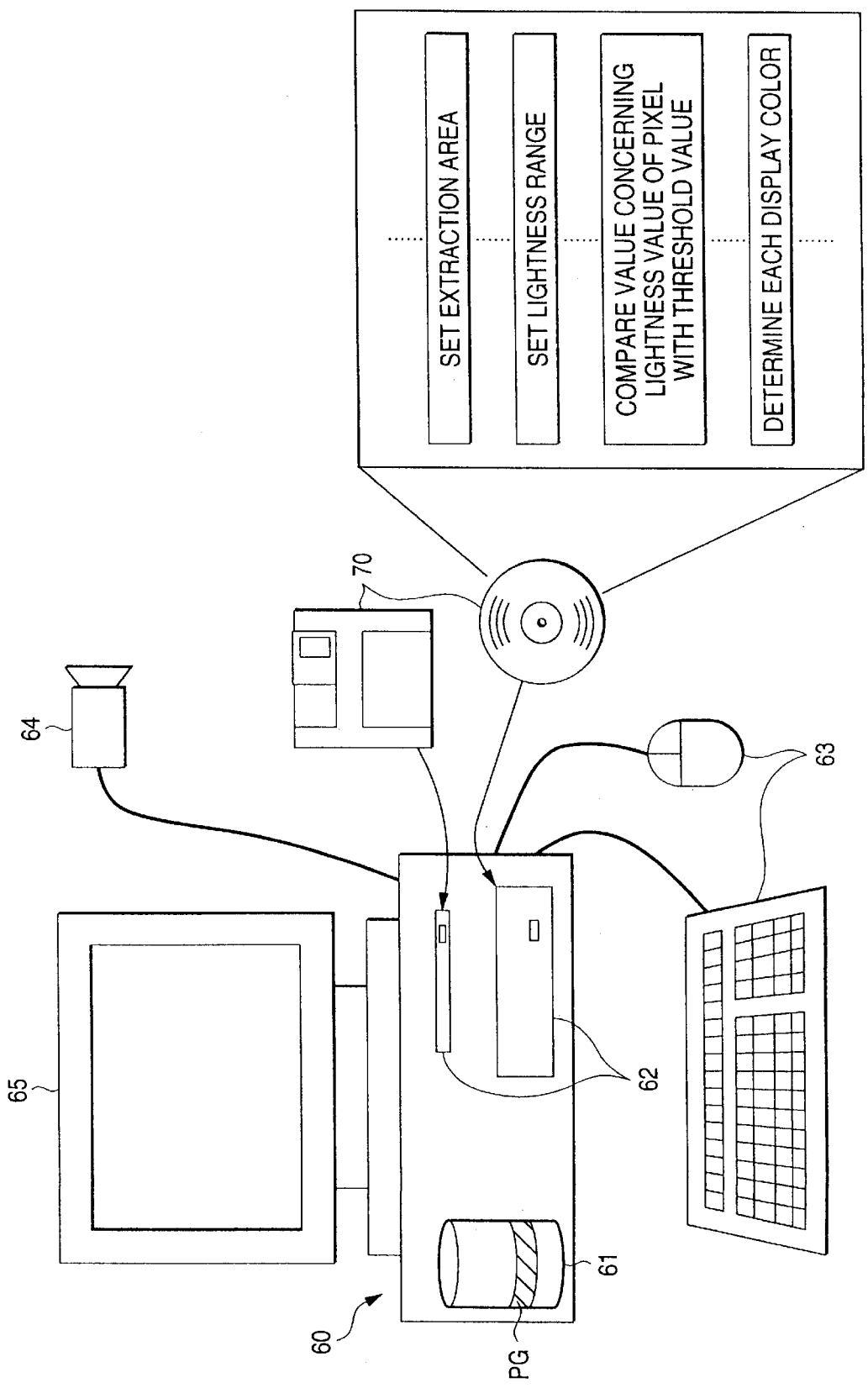
FIG. 8 is a schematic diagram applied for realizing the image processing system of the invention on a general-purpose computer.

FIG. 8 is a schematic diagram to show a configuration example for realizing the image processing system on a personal computer which is a general-purpose computer. In the figure, an image processing system 60 using a personal computer comprises external storage units 62 such as a flexible disk drive and a CD-ROM drive for reading the record contents of the invention (program code) from recording media 70 such as a flexible disk and a CD-ROM recording therein a computer program PG for functioning as an image processing system.

The image processing system 60 also contains a hard disk unit 61 for recording the program code of the computer program PG read from the recording medium 70.

Further, input units 63 such as a keyboard and a mouse, an image pickup machine 64 such as a CCD camera, and a display unit 65 such as a liquid crystal monitor are also connected to the image processing system 60.

The program code of the computer program PG read from the recording medium 70 through the external storage unit 62 is recorded, for example, on the hard disk unit 61. When the computer program PG is executed, the program code is read from the hard disk unit 61 and is transferred to storage means such as an RAM (random-access memory)(not shown) for execution. However, the program code of the computer program PG can also be read from the recording medium 70 and be directly executed.

Figure 3:
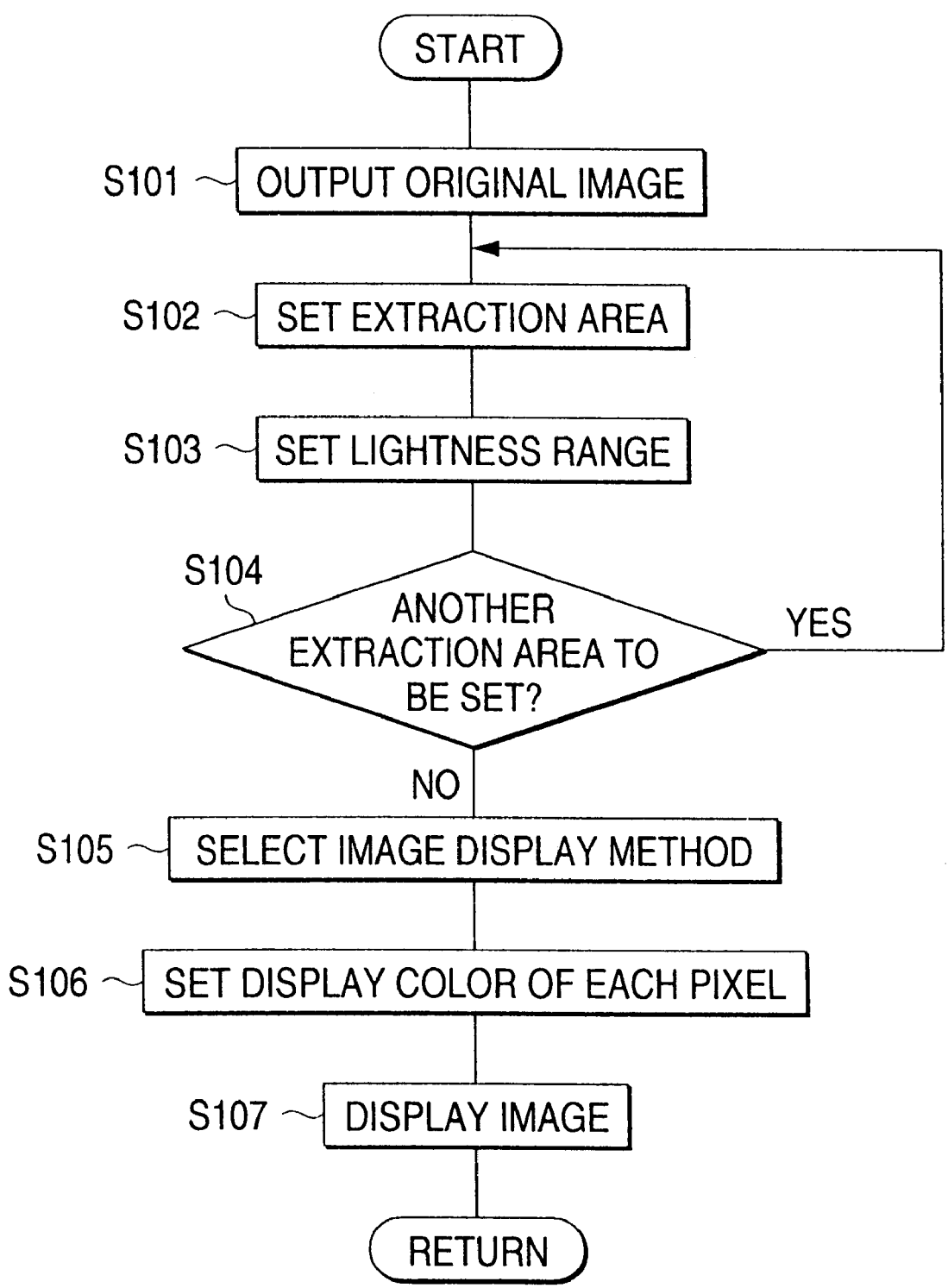
FIG. 3 is a flowchart to show the processing contents of the image processing system in the first embodiment of the invention.
Figure 4:
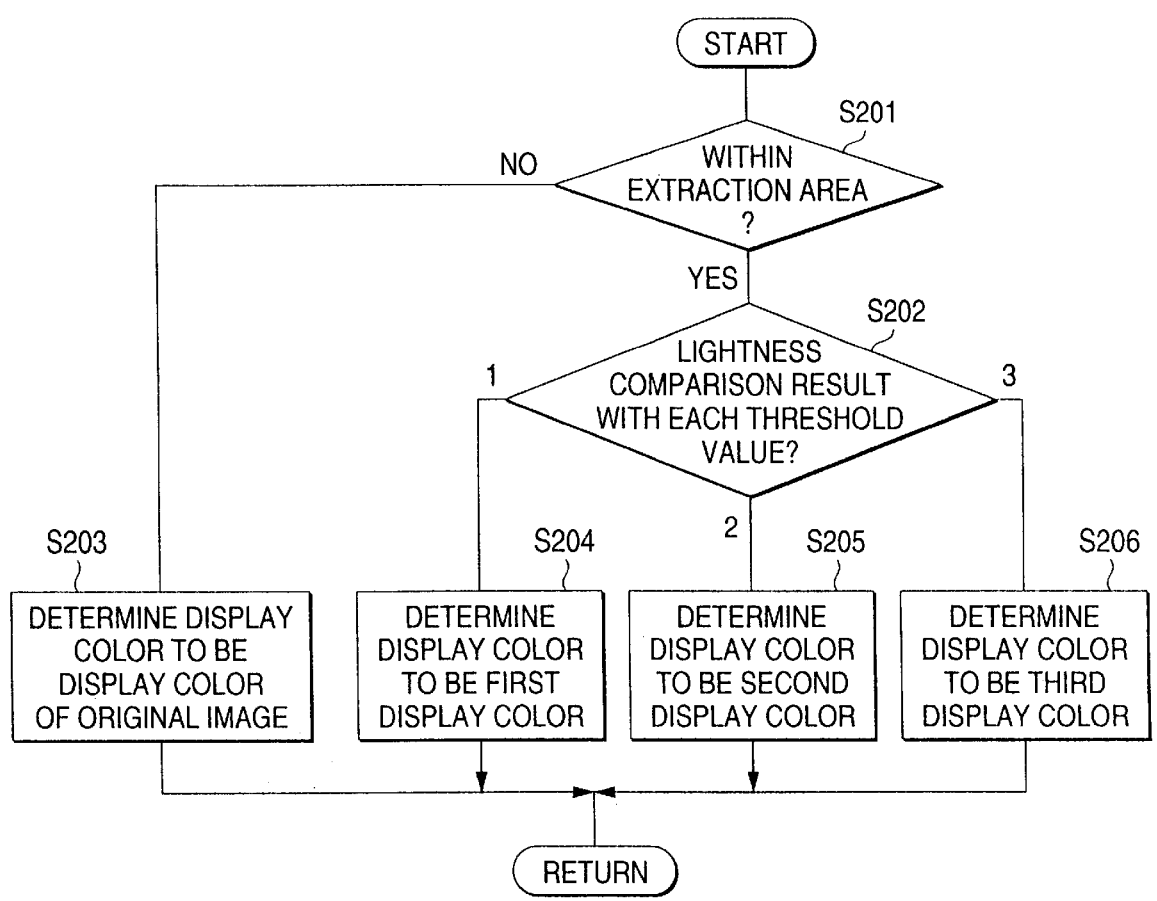
FIG. 4 is a flowchart to show the processing contents of the image processing system in the first embodiment of the invention.

The image processing system 60 operates according to the flowcharts of FIGS. 3 and 4 by the program code of the computer program PG recorded on the recording medium 70 of the invention.

Figure 9:
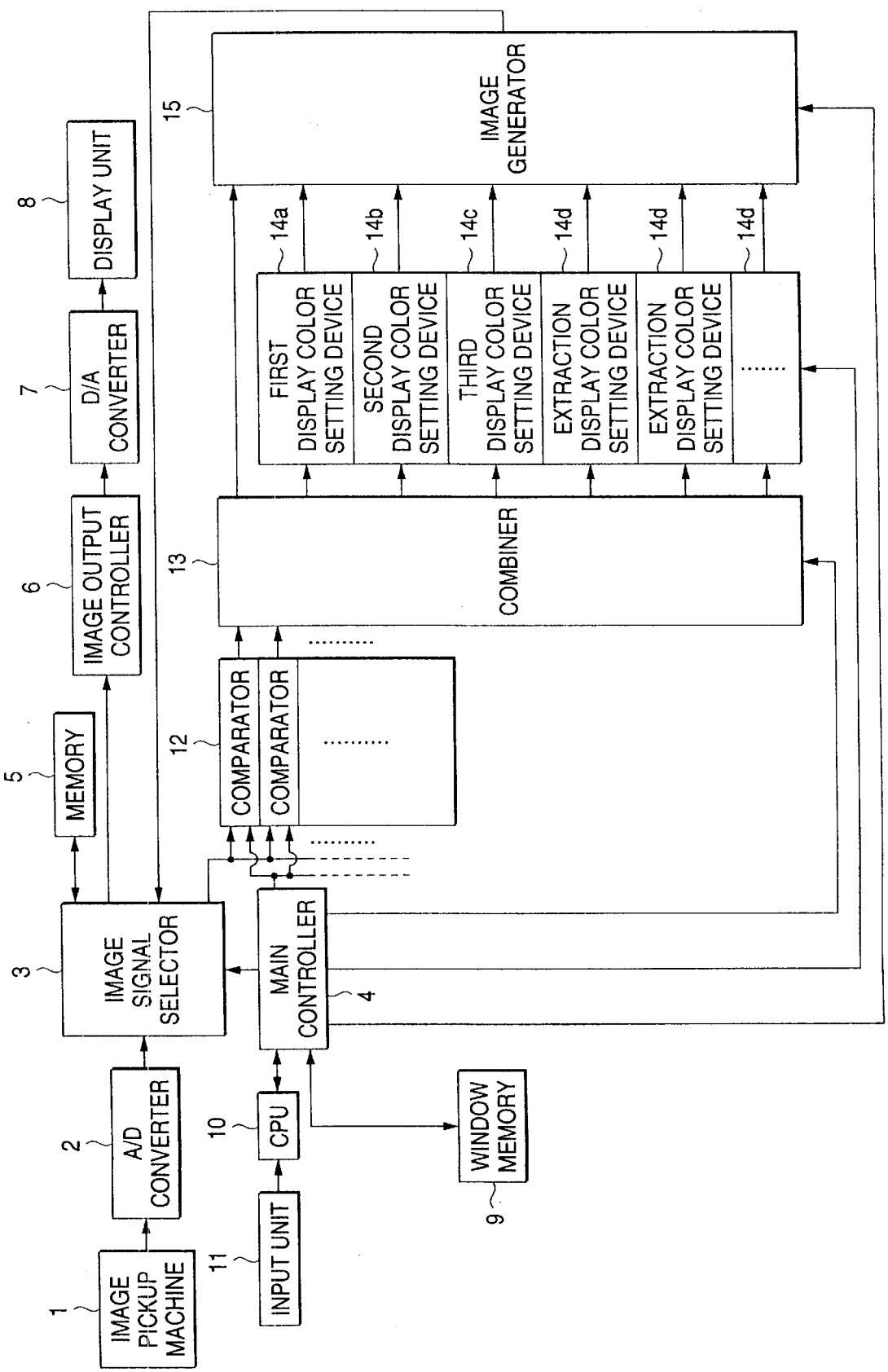
FIG. 9 is a block diagram to show the configuration of an image processing system in a second embodiment of the invention.

Second Embodiment:

FIG. 9 is a block diagram to show the configuration of an image processing system in a second embodiment of the invention. The image processing system of the second embodiment further includes extraction display color setting devices 14d, 14d, . . . provided in a one-to-one correspondence with comparators 12, 12, . . . in addition to first, second, and third display color setting devices 14a, 14b, and 14c as display color setting devices.

Based on extraction image signals from the comparators 12, 12, . . . , a combiner 13 sends data indicating each pixel not belonging to any extraction area to an image generator 15 and sends data indicating each pixel belonging to an extraction area with the lightness of the original image being out of the lightness ranges set for all extraction areas containing the pixel to the second display color setting device 14b. It sends data indicating each pixel contained in more than one lightness range to the third display color setting device 14c and sends data indicating each pixel contained only in one lightness range to the extraction display color setting device 14d corresponding to the comparator 12 making a comparison with the lightness range.

In the extraction display color setting devices 14d, 14d, . . . , like the first, second, and third display color setting devices 14a, 14b, and 14c, different extraction display colors are set based on control signals sent from a main controller 4.

To set each extraction display color, an operation signal concerning the extraction display color is received from an input unit 11 and is recorded in a volatile memory contained in a CPU 10 in relation to the corresponding extraction area; if the user skips setting of the extraction display color through the input unit 11, a preset basic color is automatically set as the extraction display color.

By selecting a display method, data indicating each pixel belonging to more than one extraction area with the lightness of the original image being contained in the lightness ranges set for all extraction areas containing the pixel can also be sent to the first display color setting device 14a for setting a first display color; this selection method is useful when a large number of extraction areas are set.

Circuit components identical with or similar to those previously described with reference to FIG. 1 are denoted by the same reference numerals in FIG. 9 and will not be described again.

Figure 10:
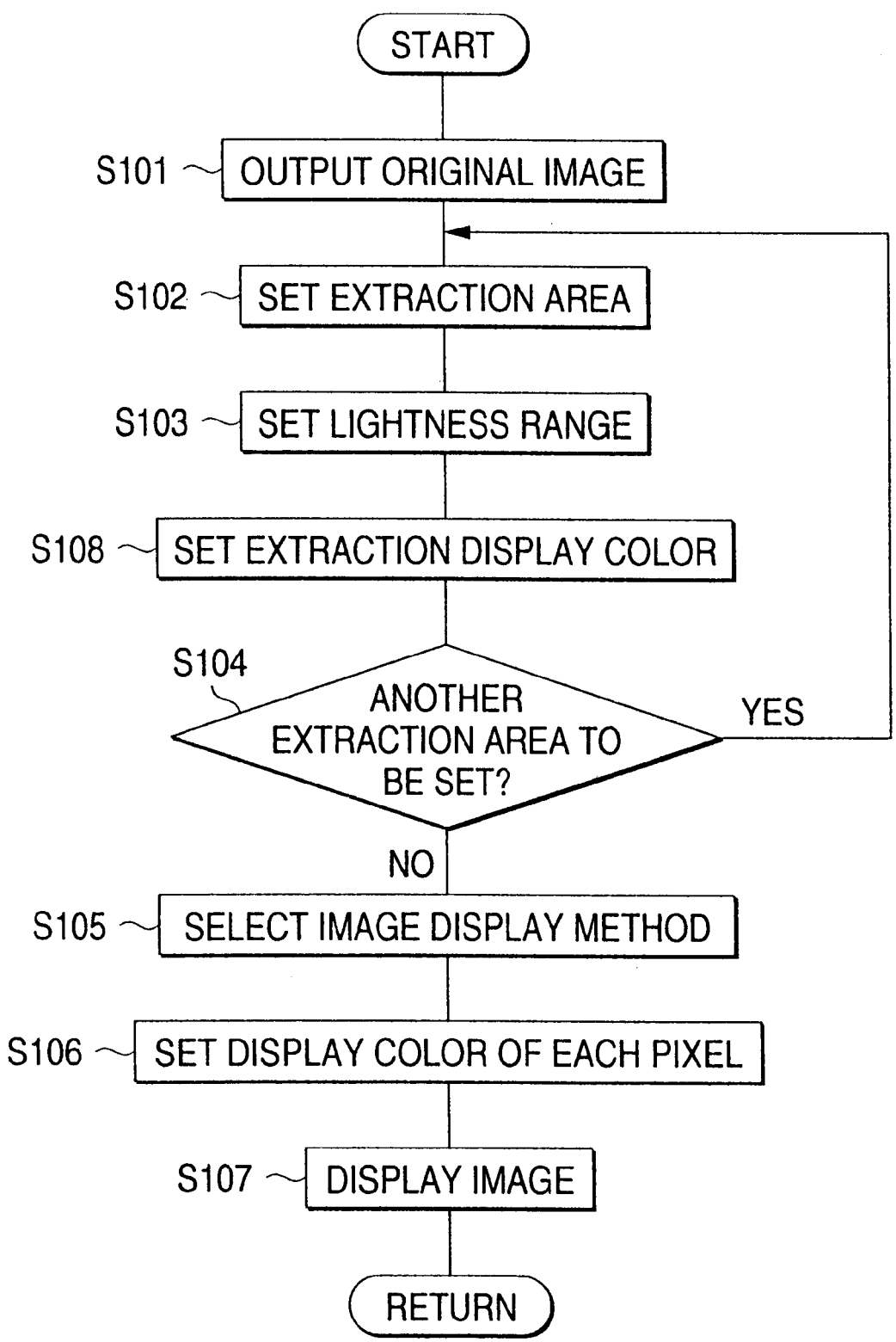
FIG. 10 is a flowchart to show the processing contents of the image processing system in the second embodiment of the invention.
Figure 11:
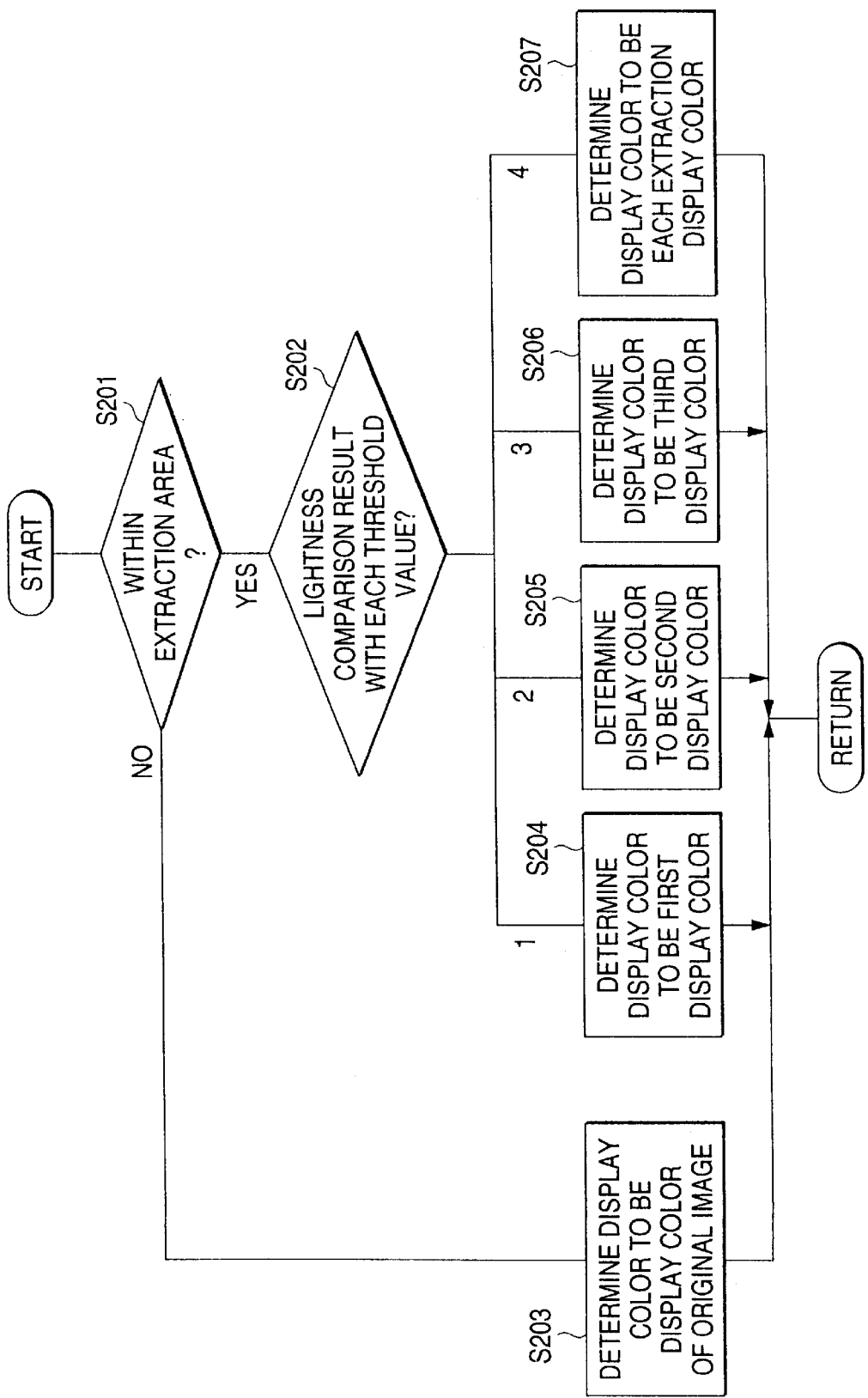
FIG. 11 is a flowchart to show the processing contents of the image processing system in the second embodiment of the invention.

Next, an image display method in the second embodiment of the invention will be described with reference to FIGS. 10 and 11 which are flowcharts to show the processing contents of the image processing system.

In the second embodiment, an extraction area is set as an area surrounding an extraction target at step S102 and further a lightness range is set corresponding to the setup extraction area at step S103, then an extraction display color is set corresponding to the extraction area at step S108. This extraction display color may be set by the user through the input unit 11 or the preset basic color may be set as the extraction display color.

The display color is set for each pixel based on the extraction area, the lightness range, and the extraction display color thus set. That is, whether or not a given pixel belongs to an extraction area is determined at step S201. If it is determined that the pixel belongs to the extraction area (YES at step S201), either or both of the upper limit threshold values and lower limit threshold values of the lightness ranges set for all extraction areas to which the pixel belongs are compared with the lightness of the original image of the pixel at step S202.

If the lightness of the original image of the pixel is compared with the threshold values of the lightness ranges and it is determined that the lightness of the original image is out of all lightness ranges (2 at step S202), the display color of the pixel is determined to be the second display color at step S205.

At step S202, if it is determined that the lightness of the original image is contained in more than one lightness range (3 at step S202), the display color of the pixel is determined to be the third display color at step S206.

At step S203, if it is determined that the lightness of the original image is contained only in one lightness range (4 at step S202), the display color of the pixel is determined to be the extraction display color corresponding to the extraction area for which the lightness range is set at step S207.

At step S201, if it is determined that the pixel does not belong to any extraction area (NO at step S201), the display color of the pixel is determined to be the display color of the original image at step S203.

At step S203, if it is determined that the pixel belongs to more than one extraction area and that the lightness of the original image is contained in all lightness ranges (1 at step S202), the display color of the pixel is determined to be the first display color at step S204 depending on the selected display method.

Steps identical with or similar to those previously described with reference to FIGS. 3 and 4 are denoted by the same step numerals in FIGS. 10 and 11 and will not be described again.

Figure 12:
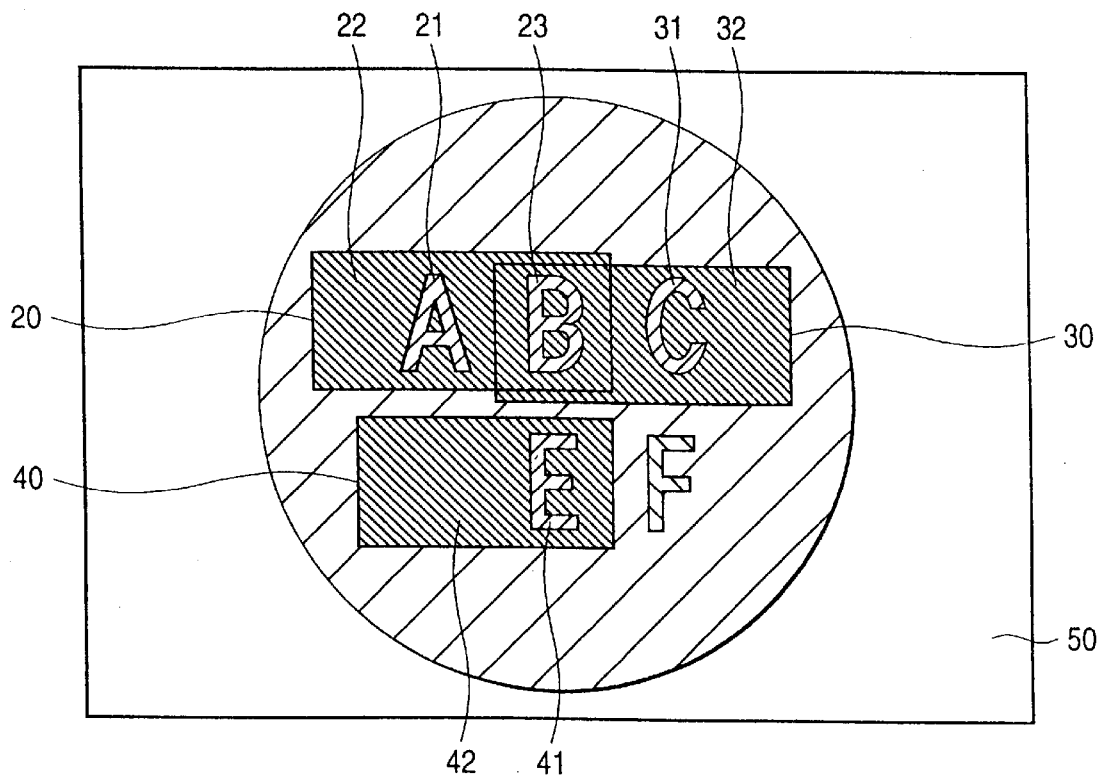
FIG. 12 is a schematic view to show a display image in the image processing system in the second embodiment of the invention.
Figure 13:
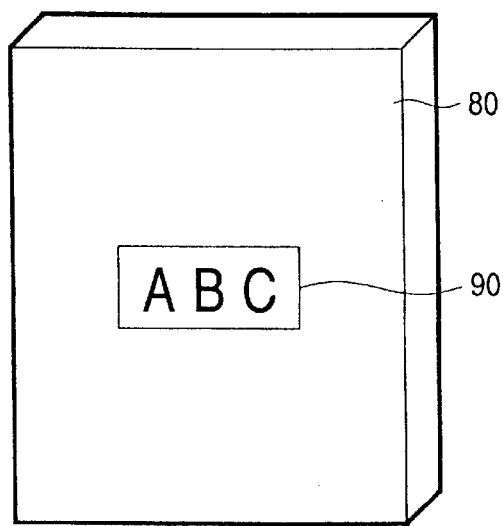
FIG. 13 is a schematic view to show a product to be inspected according to a conventional first display method.
Figure 14:
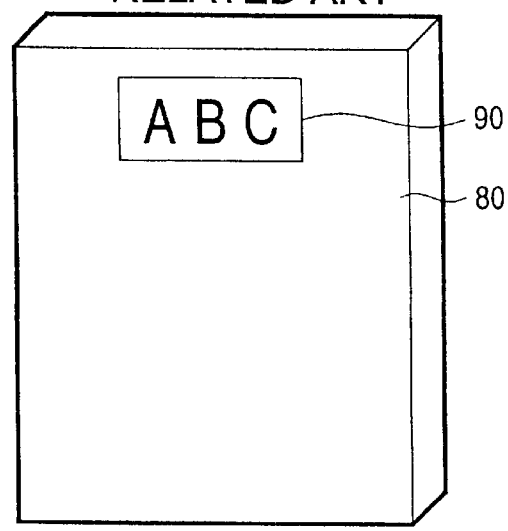
FIG. 14 is a schematic view to show the product to be inspected according to the conventional first display method.

FIG. 12 is a schematic view to show a display image in the image processing system in the second embodiment of the invention. It shows a display image provided by displaying an original image similar to those shown in FIGS. 5 to 7 in the first embodiment by the display method in the second embodiment. In FIG. 12, reference numerals 20, 30, and 40 denote extraction areas. Areas 21, 31, and 41 made up of pixels of the lightness contained in the lightness ranges set in the extraction areas 20, 30, and 40 are displayed in the extraction display colors set for the areas, and areas 22, 32, and 42 made up of pixels of the lightness out of the lightness ranges are displayed in the second display color.

An area 23 made up of pixels belonging to the extraction areas 20 and 30 with the lightness of the original image being contained only in the lightness range set for the extraction area 30 is displayed in the extraction display color corresponding to the extraction area 30. An area 50 not contained in any extraction areas is displayed in the display color of the original image.

Also in the second embodiment, a value provided by performing preprocessing for image improvement for the lightness value rather than the lightness itself may be used as the value concerning the lightness value as in the first embodiment.

Further, instead of using dedicated hardware, the image processing system of the invention may be provided by reading a computer program recorded on a recording medium into a general-purpose computer.

As described above in detail, with the image display method, the image processing system, and the recording medium according to the invention, in pixels each belonging to a plurality of extraction areas, a pixel determined to have a value concerning the lightness value of the image containing the pixel being contained in all lightness ranges set for the extraction areas is displayed in the first display color, a pixel determined to have a value concerning the lightness value of the image containing the pixel being out of all lightness ranges set for the extraction areas is displayed in the second display color different from the first color, and a pixel determined to have a value concerning the lightness value of the image containing the pixel being contained in any lightness range and being out of any lightness range is displayed in the third display color different from the first and second display colors.

Thus, for example, if a pixel which belongs to two extraction areas has a value concerning the lightness value of the image containing the pixel contained in the lightness ranges set for the two extraction areas, it is displayed in white; if the pixel has a value concerning the lightness value of the image containing the pixel out of the lightness ranges set for the two extraction areas, it is displayed in black; and if the pixel has a value concerning the lightness value of the image containing the pixel contained in one lightness range and out of the other lightness range, it is displayed in gray, whereby the extraction results in the two extraction areas can be grasped at a time; the invention provides the excellent advantage.

Further, each pixel not belonging to any extraction area is displayed in the display color of the original image containing the pixel, whereby the positional relationship between the whole display image and the image displayed in the extraction area can be grasped clearly; the invention provides the excellent advantage.

Also, an extraction display color to display a pixel extracted for each extraction area is set and each pixel having a value concerning the lightness value of the image containing the pixel contained in the lightness range set for an extraction area is displayed in the extraction display color corresponding to the extraction area, whereby which extraction area a pixel belonging to more than one extraction area is extracted based on the lightness range set for can be understood clearly and at a time; the invention provides the excellent advantage.

What is claimed is:

1. An image display method wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, said image display method comprising the steps of:

setting a plurality of extraction areas to which the pixels to be extracted in the image belong;

setting lightness ranges in a one-to-one correspondence with the setup extraction areas, each lightness range for extracting the pixels:in the corresponding extraction area;

displaying each pixel belonging to one or more extraction areas with the value concerning the lightness value of the image being contained in all lightness ranges set for the extraction areas in a first display color;

displaying each pixel belonging to one or more extraction areas with the value concerning the lightness value of the image being out of all lightness ranges set for the extraction areas in a second display color different from the first display color; and displaying each pixel belonging to more than one extraction area with the value concerning the lightness value of the image being contained in any of the lightness ranges set for the extraction areas and out of any of the lightness ranges in a third display color different from the first and second display colors.

2. The image display method according to claim 1, further comprising the step of displaying each pixel not belonging to the extraction areas in a display color of the image.

3. The image display method according to claim 2, wherein the display color of the image is a display color of an original image obtained by an image pickup machine.

4. An image display method wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, said image display method comprising the steps of:

setting a plurality of extraction areas to which the pixels to be extracted in the image belong;

setting lightness ranges in a one-to-one correspondence with the setup extraction areas, each lightness range for extracting the pixels in the corresponding extraction area;

setting extraction display colors in a one-to-one correspondence with the setup extraction areas, each extraction display color for displaying the pixels extracted in the corresponding extraction area;

displaying each pixel belonging to one or more extraction areas with the value concerning the lightness value of the image being contained only in the lightness range set for one of the extraction areas in an extraction display color corresponding to the extraction area;

displaying each pixel belonging to one or more extraction areas with the value concerning the lightness value of the image being out of all lightness ranges set for the extraction areas in a non-extraction display color different from all extraction display colors; and displaying each pixel belonging to more than one extraction area with the value concerning the lightness value of the image being contained in the lightness ranges set for two or more of the extraction areas in a common extraction display color different from all extraction display colors and the non-extraction display color.

5. An image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, said image processing system comprising:

means for accepting setting of a plurality of extraction areas to which the pixels to be extracted in the image belong;

means for accepting setting of lightness ranges in a one-to-one correspondence with the setup extraction areas to extract the pixels from the corresponding extraction area;

means for displaying each pixel belonging to one or more extraction areas with the value concerning the lightness value of the image being contained in all lightness ranges set for the extraction areas on the display unit in a first display color;

means for displaying each pixel belonging to one or more extraction areas with the value concerning the lightness value of the image being out of all lightness ranges set for the extraction areas on the display unit in a second display color different from the first display color; and means for displaying each pixel belonging to more than one extraction area with the value concerning the lightness value of the image being contained in any of the lightness ranges set for the extraction areas and out of any of the lightness ranges on the display unit in a third display color different from the first and second display colors.

6. The image processing system according to claim 5, further comprising means for displaying each pixel not belonging to the extraction areas on the display unit in a display color of the image.

7. The image processing system according to claim 6, wherein the display color of the image is a display color of an original image obtained by an image pickup machine.

8. An image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, said image processing system comprising:

means for accepting setting of a plurality of extraction areas to which the pixels to be extracted in the image belong;

means for accepting setting of lightness ranges in a one-to-one correspondence with the setup extraction areas to extract the pixels from the corresponding extraction area;

means for accepting setting of extraction display colors in a one-to-one correspondence with the setup extraction areas to display the pixels extracted in the corresponding extraction area;

means for displaying each pixel belonging to one or more extraction areas with the value concerning the lightness value of the image being contained only in the lightness range set for one of the extraction areas on the display unit in an extraction display color corresponding to the extraction area;

means for displaying each pixel belonging to one or more extraction areas with the value concerning the lightness value of the image being out of all lightness ranges set for the extraction areas on the display unit in a non-extraction display color different from all extraction display colors; and means for displaying each pixel belonging to more than one extraction area with the value concerning the lightness value of the image being contained in the lightness ranges set for two or more of the extraction areas on the display unit in a common extraction display color different from all extraction display colors and the non-extraction display color.

9. An image processing system wherein to extract in pixels making up an image, a pixel having a value concerning a lightness value of the image contained in a lightness range with a value concerning a predetermined lightness value as a threshold value, a pixel having a value concerning the lightness value of the image contained in the lightness range and a pixel having a value concerning the lightness value out of the lightness range are displayed on a display unit in different display colors, said image processing system comprising:

means for accepting setting of a plurality of extraction areas to which the pixels to be extracted in the image belong;

means for accepting setting of lightness ranges in a one-to-one correspondence with the setup extraction areas to extract the pixels from the corresponding extraction area;

determination: means for determining whether or not a pixel belongs to any extraction area;

comparison means, if said determination means determines that the pixel belongs to any extraction area, for comparing the value concerning the lightness value of the image of the pixel with a threshold value of the lightness range corresponding to each extraction area to which the pixel belongs;

means for displaying the pixel on the display unit in a first display color if said comparison means determines that the value concerning the lightness value of the image of the pixel is contained in all lightness ranges;

means for displaying the pixel on the display unit in a second display color different from the first display color if said comparison means determines that the value concerning the lightness value of the image of the pixel is out of all lightness ranges; and means for displaying the pixel on the display unit in a third display color different from the first and second display colors if said comparison means determines that the value concerning the lightness value of the image of the pixel is contained in any lightness range and is out of any lightness range.

10. A computer-readable recording medium recording therein a computer program for causing a computer to determine a display color of an image, to extract in pixels making up the image, a pixel having a value concerning a lightness value of the image contained in a lightness range with a value concerning a predetermined lightness value as a threshold value, for displaying a pixel having a value concerning the lightness value of the image contained in the lightness range and a pixel having a value concerning the lightness value out of the lightness range on a display unit in different display colors, said computer program comprising:

first program code means for causing the computer to accept setting of a plurality of extraction areas to which the pixels to be extracted in the image belong;

second program code means for causing the computer to accept setting of lightness ranges in a one-to-one correspondence with the setup extraction areas to extract the pixels from the corresponding extraction area;

third program code means for causing the computer to determine whether or not a pixel belongs to any extraction area;

fourth program code means, if it is determined that the pixel belongs to any extraction area, for causing the computer to compare the value concerning the lightness value of the image of the pixel with a threshold value of the lightness range corresponding to each extraction area to which the pixel belongs;

fifth program code means for causing the computer to determine the display color of the pixel to be a first display color if it is determined that the value concerning the lightness value of the image of the pixel is contained in all lightness ranges as a result of comparing the value concerning the lightness value of the image of the pixel with the threshold value of the lightness range corresponding to each extraction area to which the pixel belongs;

sixth program code means for causing the computer to determine the display color of the pixel to be a second display color different from the first display color if it is determined that the value concerning the lightness value of the image of the pixel is out of all lightness ranges as a result of comparing the value concerning the lightness value of the image of the pixel with the threshold value of the lightness range corresponding to each extraction area to which the pixel belongs; and seventh program code means for causing the computer to determine the display color of the pixel to be a third display color different from the first and second display colors if it is determined that the value concerning the lightness value of the image of the pixel is contained in any lightness range and is out of any lightness range as a result of comparing the value concerning the lightness value of the image of the pixel with the threshold value of the lightness range corresponding to each extraction area to which the pixel belongs.

* * * * *